DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 5

T950,002

COMPOSITIONS FOR THE STABILIZATION OF FLAME RETARDANT STYRENIC POLYMERS

Richard Bradley, 303 Broadway, Dobbs Ferry, N.Y. 10522; Joseph Martin Farber, 28 Braddock Court, Yorktown Heights, N.Y. 10598; and Lawrence A. Testa, Candlewood Isle, Box 128, New Fairfield, Conn. 06810

Filed Oct. 28, 1975, Ser. No. 626,388
Int. Cl.[2] C08K *5/53*
U.S. Cl. 260—45.75 N
No Drawing. 39 Pages Specification

Flame retardant styrenic polymers which are normally subject to ultraviolet light and oxidative deterioration are stabilized against said deterioration by incorporating therein, light stabilizers such as substituted benzotriazoles, hindered amines, or hindered phenol metal phosphonates, or a mixture thereof, and combinations of these light stabilizers with a hindered phenol antioxidant, an acid acceptor such as a metal organic salt, such as zinc stearate and tin maleate, or an oxirane compound, and also optionally a thioester, an organic phosphite, such as distearyl pentaerythritol dephosphite.